(12) United States Patent
Sakamoto et al.

(10) Patent No.: US 10,643,387 B2
(45) Date of Patent: May 5, 2020

(54) THREE-DIMENSIONAL DATA DISPLAY DEVICE, THREE-DIMENSIONAL DATA DISPLAY METHOD, AND PROGRAM

(71) Applicant: Mitsubishi Hitachi Power Systems, Ltd., Kanagawa (JP)

(72) Inventors: Kenshi Sakamoto, Yokohama (JP); Hiroyuki Matsuoka, Takasago (JP); Keigo Fujiwara, Takasago (JP); Minoru Nakanishi, Kobe (JP); Masashi Yamamoto, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 16/094,154

(22) PCT Filed: Mar. 6, 2017

(86) PCT No.: PCT/JP2017/008800
§ 371 (c)(1),
(2) Date: Oct. 16, 2018

(87) PCT Pub. No.: WO2017/203792
PCT Pub. Date: Nov. 30, 2017

(65) Prior Publication Data
US 2019/0139305 A1   May 9, 2019

(30) Foreign Application Priority Data

May 23, 2016   (JP) .................................. 2016-102333

(51) Int. Cl.
*G06T 19/00* (2011.01)
*G09B 9/00* (2006.01)
*G06T 7/73* (2017.01)

(52) U.S. Cl.
CPC .............. *G06T 19/003* (2013.01); *G06T 7/75* (2017.01); *G06T 19/00* (2013.01); *G09B 9/00* (2013.01)

(58) Field of Classification Search
CPC ..................................................... G06T 19/003
See application file for complete search history.

(56) References Cited

U.S. PATENT DOCUMENTS

2003/0206166 A1   11/2003 Kamata et al.
2003/0231175 A1   12/2003 Pfister et al.
(Continued)

FOREIGN PATENT DOCUMENTS

JP   2002-045566   2/2002
JP   2002-304112   10/2002
(Continued)

OTHER PUBLICATIONS

International Search Report dated May 30, 2017 in corresponding International (PCT) Application No. PCT/JP2017/008800, with English translation.
(Continued)

Primary Examiner — Phi Hoang
(74) Attorney, Agent, or Firm — Wenderoth, Lind & Ponack, L.L.P.

(57) ABSTRACT

A three-dimensional data display device includes an identification unit which is configured to identify a point of interest which is a point on three-dimensional data, a viewpoint control unit which is configured to move a viewpoint along an annular movement route surrounding the point of interest with a sight line directed toward the point of interest, and a rendering unit which is configured to obtain two-dimensional data by rendering the three-dimensional data on the basis of a viewpoint.

9 Claims, 10 Drawing Sheets

(56) References Cited

U.S. PATENT DOCUMENTS

| | | | |
|---|---|---|---|
| 2011/0075885 A1 | 3/2011 | Yuan | |
| 2013/0218467 A1* | 8/2013 | Ogawa | G08G 1/096827 |
| | | | 701/533 |
| 2014/0244155 A1* | 8/2014 | Abe | G01C 21/00 |
| | | | 701/410 |
| 2016/0091324 A1* | 3/2016 | Horihata | G08G 1/0112 |
| | | | 701/417 |
| 2016/0098601 A1* | 4/2016 | Yang | G06T 19/006 |
| | | | 382/103 |
| 2016/0116290 A1* | 4/2016 | Haverinen | G01C 21/206 |
| | | | 701/525 |

FOREIGN PATENT DOCUMENTS

| | | |
|---|---|---|
| JP | 2002-366976 | 12/2002 |
| JP | 2005-070161 | 3/2005 |
| JP | 2005-135161 | 5/2005 |
| JP | 2005-215314 | 8/2005 |
| JP | 2009-053922 | 3/2009 |
| JP | 2011-170761 | 9/2011 |
| JP | 2014-076814 | 5/2014 |
| JP | 2016-001360 | 1/2016 |
| KR | 10-2012-0083891 | 7/2012 |
| WO | 2015/053266 | 4/2015 |
| WO | 2016/157523 | 10/2016 |

OTHER PUBLICATIONS

Written Opinion of the International Searching authority dated May 30, 2017 in corresponding International (PCT) Application No. PCT/JP2017/008800, with English translation.

* cited by examiner

THREE-DIMENSIONAL DATA DISPLAY DEVICE, THREE-DIMENSIONAL DATA DISPLAY METHOD, AND PROGRAM

TECHNICAL FIELD

The present invention relates to a three-dimensional data display device, a three-dimensional data display method, and a program.

Priority is claimed on Japanese Patent Application No. 2016-102333, filed May 23, 2016, the content of which is incorporated herein by reference.

BACKGROUND ART

Patent Document 1 discloses a technology related to a plant operation training apparatus which simulates an operation of a plant represented by three-dimensional data by operating an avatar disposed in a virtual space.

CITATION LIST

Patent Literature

Patent Document 1

PCT International Publication No. WO2015/053266

SUMMARY OF INVENTION

Technical Problem

By an operation of a plant operation training device disclosed in Patent Document 1, it is possible for a user to ascertain a spatial position of a part to be operated. In this case, however, it is not possible to easily know the spatial position of the part because the operator needs to know an operation of a simulator first to know the spatial position of the part. In particular, in order to recognize the entire external appearance of a predetermined part, an advanced operation of having a sight line of an avatar directed toward the corresponding part while causing the avatar to move around a corresponding part is required.

An object of the present invention is to provide a three-dimensional data display device, a three-dimensional data display method, and a program which can allow an operator to easily recognize spatial positions of parts constituting a plant.

Solution to Problem

According to a first aspect of the present invention, a three-dimensional data display device includes a rendering unit which is configured to obtain two-dimensional data by rendering three-dimensional data on the basis of a viewpoint, an identification unit which is configured to identify a point of interest which is a point in the three-dimensional data, and a viewpoint control unit which is configured to move the viewpoint along an annular movement route surrounding the point of interest with a sight line directed toward the point of interest.

According to a second aspect of the present invention, the three-dimensional data display device according to the first aspect may further include a route setting unit which is configured to receive an input of the geometric parameter settings of the movement route.

According to a third aspect of the present invention, in the three-dimensional data display device according to the second aspect, the rendering unit may render a solid figure which represents the movement route and the three-dimensional data when the route setting unit is configured to receive the input of the geometric parameter settings.

According to a fourth aspect of the present invention, in the three-dimensional data display device according to the third aspect, the solid figure may have a shape different from the movement route.

According to a fifth aspect of the present invention, the three-dimensional data display device according to any one of the first to fourth aspects further includes a viewpoint recording unit which is configured to record a position of the viewpoint and a sight line direction at the time at which the point of interest is identified by the identification unit in a viewpoint storage unit, in which the viewpoint control unit may change a position of the viewpoint and a sight line direction to the position and the sight line direction stored by the viewpoint storage unit after a movement of the viewpoint along the movement route ends.

According to a sixth aspect of the present invention, the three-dimensional data display device according to any one of the first to fifth aspects further includes a point of interest input unit which is configured to receive a selection of a point in the three-dimensional data obtained by the rendering unit, in which the identification unit may identify a point on a half line, which corresponds to the selected point in the three-dimensional data and is closest to the viewpoint, as the point of interest.

According to a seventh aspect of the present invention, in the three-dimensional data display device according to any one of the first to sixth aspects, the rendering unit may render a vertical direction in the two-dimensional data to coincide with a vertical direction of the three-dimensional data.

According to an eighth aspect of the present invention, in the three-dimensional data display device according to any one of the first to seventh aspects, the movement route may be in an annular shape centered on the point of interest.

According to a ninth aspect of the present invention, the three-dimensional data display device according to any one of the first to eighth aspects further includes a viewpoint operation unit which is configured to receive an operation input of the viewpoint, in which the viewpoint control unit may move the viewpoint according to the input when the viewpoint operation unit is configured to receive the input during a movement of the viewpoint along the movement route.

According to a tenth aspect of the present invention, a method of displaying three-dimensional data includes obtaining two-dimensional data by rendering three-dimensional data on the basis of a viewpoint, identifying a point of interest which is a point in the three-dimensional data, and moving the viewpoint along an annular movement route surrounding the point of interest with a sight line directed toward the point of interest.

According to an eleventh aspect of the present invention, a program causes a computer to execute obtaining two-dimensional data by rendering three-dimensional data on the basis of a viewpoint, identifying a point of interest which is a point in the three-dimensional data, and moving the viewpoint along an annular movement route surrounding the point of interest with a sight line directed toward the point of interest.

Advantageous Effects of Invention

According to at least one of the aspects described above, the three-dimensional data display device can render an entire external appearance of a predetermined point of interest as two-dimensional data by moving a viewpoint around the point of interest with a sight line directed toward the point of interest. As a result, the three-dimensional data display device can allow an operator to easily recognize spatial positions of parts constituting a plant.

DESCRIPTION OF EMBODIMENTS

First Embodiment

Hereinafter, a first embodiment will be described in detail with reference to drawings.

Figure 1:
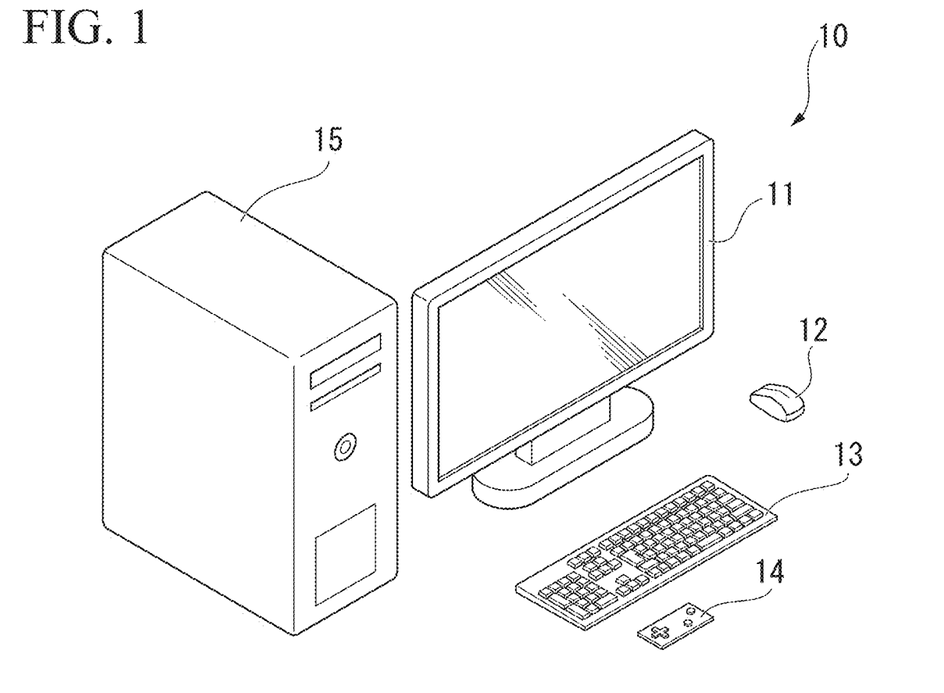
FIG. 1 is a perspective view which shows an external appearance of a three-dimensional data display device according to a first embodiment.

FIG. 1 is a perspective view which shows an external appearance of a three-dimensional data display device according to the first embodiment.

A three-dimensional data display device 10 is a device which displays three-dimensional data representing a facility such as a plant. The three-dimensional data display device 10 can dispose three-dimensional data and an avatar in a virtual space, and move the avatar by walking (walk-through) or flying (fly-through) in a facility represented by the three-dimensional data.

The three-dimensional data display device 10 includes a display device 11, a mouse 12, a keyboard 13, a joy pad 14, and an arithmetic operation device 15.

The display device 11 displays results of arithmetic operations of the arithmetic operation device 15.

The mouse 12, the keyboard 13, and the joy pad 14 are input devices which receive an input operation of a user to the arithmetic operation device 15.

The arithmetic operation device 15 performs an arithmetic operation in accordance with an input through the mouse 12, the keyboard 13, and the joy pad 14, and causes the display device 11 to display a result of the arithmetic operation.

Figure 2:
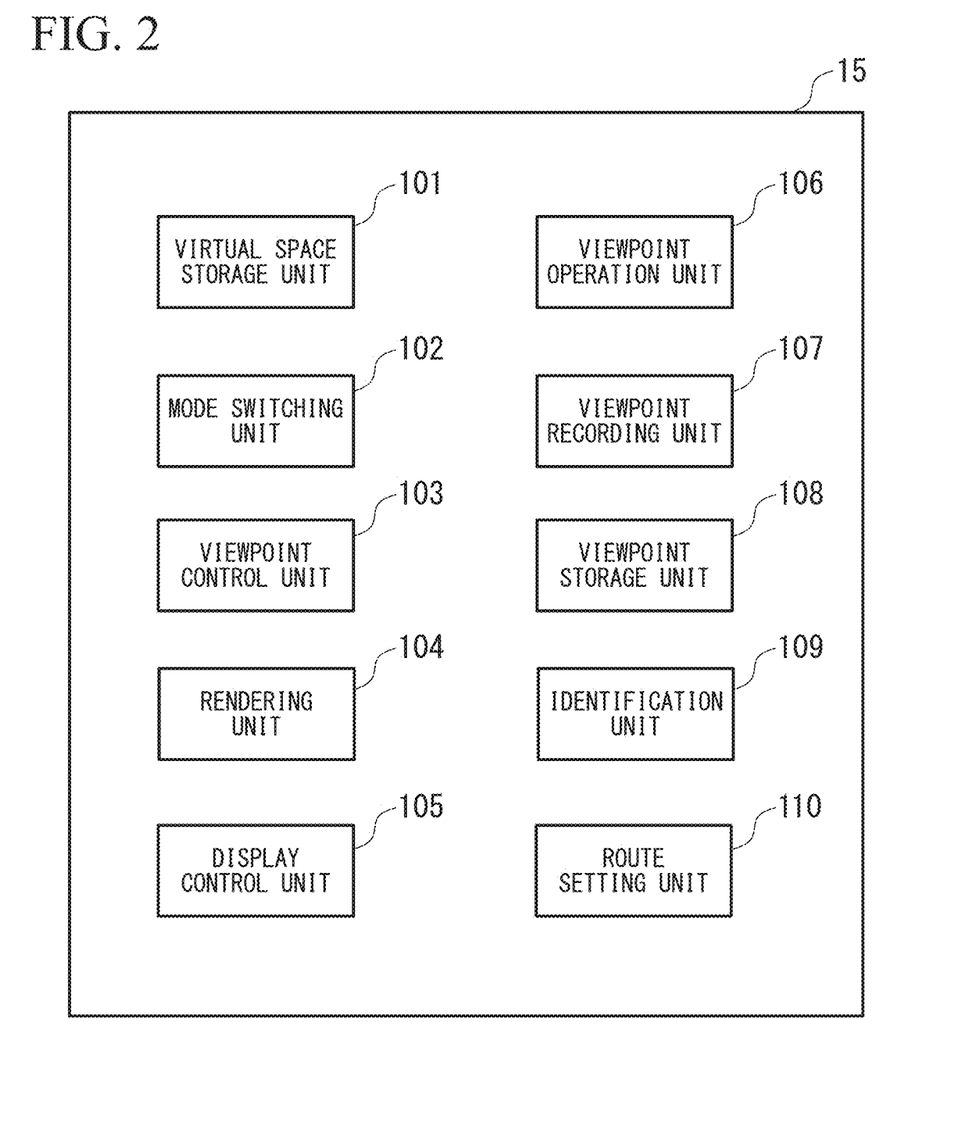
FIG. 2 is a schematic block diagram which shows a configuration of the three-dimensional data display device according to the first embodiment.

FIG. 2 is a schematic block diagram which shows a configuration of the three-dimensional data display device according to the first embodiment.

The arithmetic operation device 15 of the three-dimensional data display device 10 includes a virtual space storage unit 101, a mode switching unit 102, a viewpoint control unit 103, a rendering unit 104, a display control unit 105, a viewpoint operation unit 106, a viewpoint recording unit 107, a viewpoint storage unit 108, an identification unit 109, and a route setting unit 110. The virtual space storage unit 101 stores the three-dimensional data disposed in a virtual space. In other words, the position of a point in the three-dimensional data is represented using a virtual space coordinate system. The virtual space coordinate system according to the present embodiment is represented by an orthogonal coordinate system constituted by an X axis, a Y axis, and a Z axis. The Z axis of these is an axis representing a vertical direction in the virtual space.

The mode switching unit 102 receives an input for switching of a mode (a movement mode) relating to a method of moving a viewpoint in a virtual space. Movement modes include an avatar mode in which an avatar is moved in the facility and a viewpoint is moved in accordance with the movement of the avatar, and a satellite mode in which a viewpoint is automatically rotated around a designated point of interest. A viewpoint is an origin of projection in rendering of the three-dimensional data. A sight line direction is a direction of the projection in the rendering of the three-dimensional data. Switching of the movement mode is performed by an operation of the mouse 12. The mode switching unit 102 switches the movement mode to the satellite mode according to a point of interest being clicked with the mouse 12. That is, the mode switching unit 102 is an example of a point of interest input unit. The mode switching unit 102 switches the movement mode to the avatar mode according to a pressing down of a switching button for the avatar mode with the mouse 12 being received.

The viewpoint control unit 103 controls a posture of a viewpoint in a virtual space (a position and a sight line direction) on the basis of a movement mode.

The rendering unit 104 renders three-dimensional data stored by the virtual space storage unit 101 on the basis of a viewpoint controlled by the viewpoint control unit 103, and obtains two-dimensional data.

The display control unit 105 causes the display device 11 to display the two-dimensional data obtained by the rendering unit 104.

The viewpoint operation unit 106 receives an operation input that changes the posture of a viewpoint on virtual space. The operation input of a viewpoint is performed by an operation of the joy pad 14.

The viewpoint recording unit 107 records the posture of a viewpoint before switching in the viewpoint storage unit 108 when a movement mode is switched from the avatar mode to the satellite mode.

The viewpoint storage unit 108 stores a posture of a viewpoint when a movement mode is switched from the avatar mode to the satellite mode.

The identification unit 109 identifies coordinates of a point of interest when a movement mode is switched from the avatar mode to the satellite mode. For example, when a user designates a point in the two-dimensional data displayed on the display device 11 using the mouse 12, a point in the three-dimensional data corresponding to this point may be identified as a point of interest. That is, the identification unit 109 identifies a point corresponding to a designated point in the three-dimensional data as a point of interest.

Figure 3:
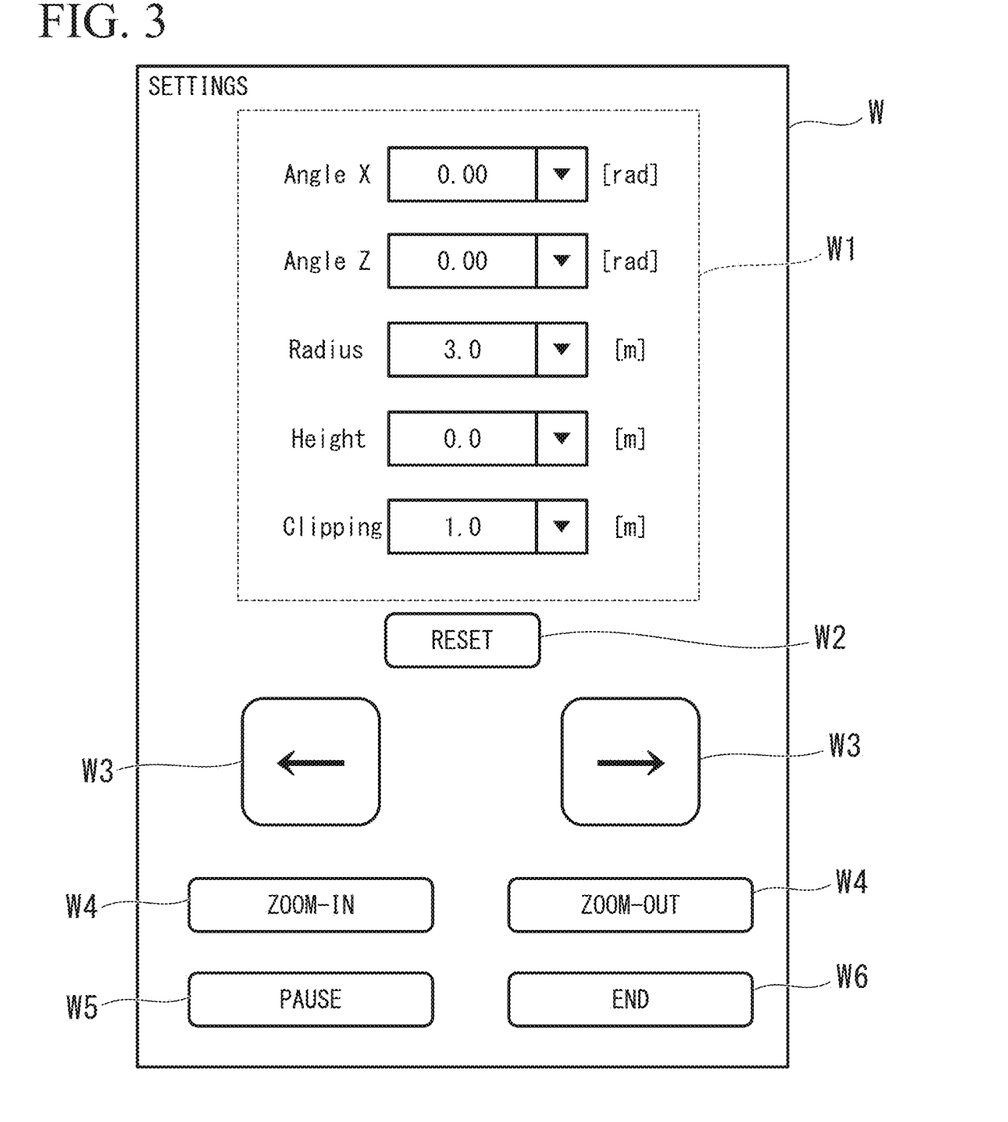
FIG. 3 is a diagram which shows an example of a setting window of a movement route according to the first embodiment.

The route setting unit 110 receives settings for a movement route of a viewpoint in the satellite mode on the basis of the point of interest identified by the identification unit 109. A movement route is set to surround the point of interest. Specifically, a movement route is a circular route formed around a rotation axis passing through the point of interest. FIG. 3 is a diagram which shows an example of a setting window of a movement route according to the first embodiment. The route setting unit 110 causes the display device 11 to display a setting window W shown in FIG. 3, and receives inputs of various types of setting due to operations of the keyboard 13 and the mouse 12. Specifically, the route setting unit 110 receives settings for an inclination (an angle X value, an angle Z value) of a movement route (the rotation axis), a radius of the movement route (a radius value), a distance (a height value) between a center point of the movement route and the point of interest, and a clipping distance (a clipping value) of the three-dimensional data. The Angle X value, the Angle Y value, the Radius value, and the Height value are examples of geometric parameters of the movement route.

The setting window W includes an input field W1, a reset button W2, an action button W3, a zoom button W4, a pause button W5, and an end button W6 for these geometric parameters. The reset button W2 is a button for resetting an input item.

The action button W3 is a button for starting a movement of the viewpoint along a movement route. The setting window W includes two types of buttons, which are a right rotation button and a left rotation button, as action buttons W3.

The zoom button W4 is a button for zooming in or zooming out in a sight line direction. The setting window W includes a zoom-in button and a zoom-out button as the zoom button W4.

The pause button W5 is a button for stopping the movement of the viewpoint along a movement route. The end button W6 is a button for ending operation in the satellite mode and switching the movement mode to the avatar mode.

The viewpoint control unit 103 changes a posture of the viewpoint according to an operation of the viewpoint operation unit 106 when the movement mode is the avatar mode. In another embodiment, when there is set data in which a behavior of the avatar is defined, the viewpoint control unit 103 may also change the posture of the viewpoint on the basis of the set data. The viewpoint control unit 103 changes the posture of the viewpoint along a movement route set by the route setting unit 110 when the movement mode is the satellite mode.

Next, an operation of the three-dimensional data display device 10 according to the first embodiment will be described.

Figure 4:
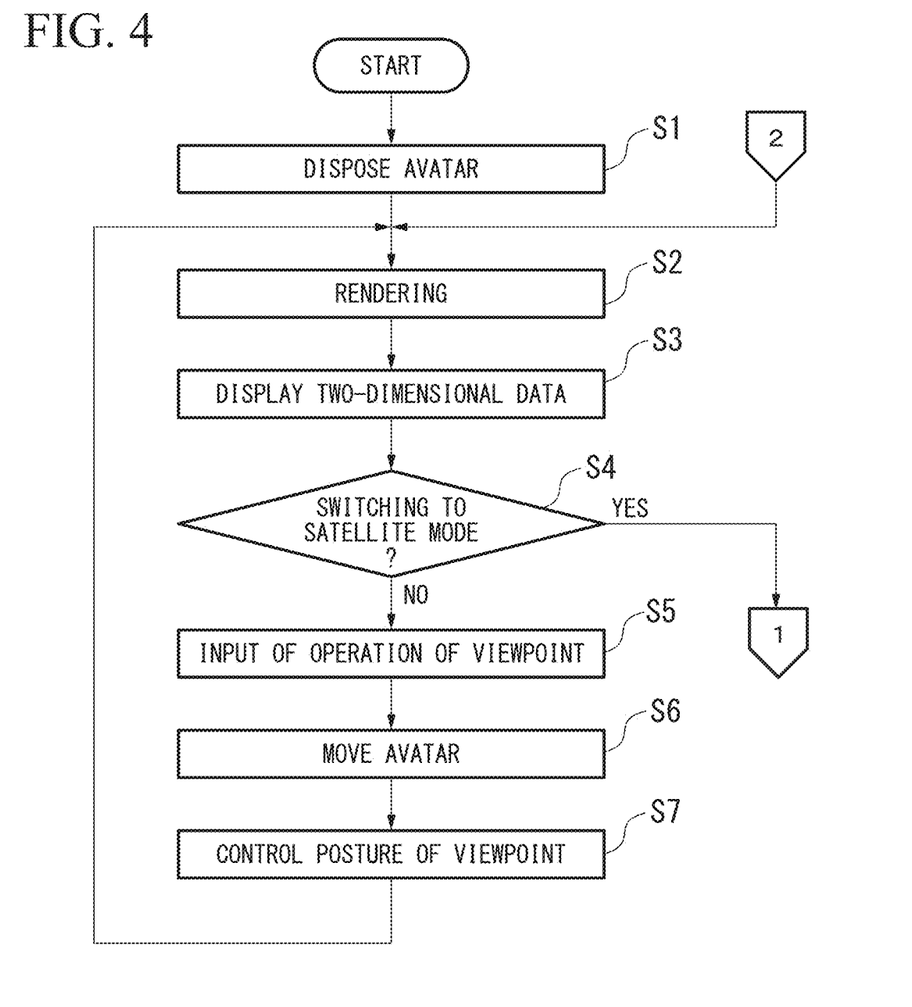
FIG. 4 is a flowchart which shows an operation of the three-dimensional data display device according to the first embodiment in an avatar mode.
Figure 5:
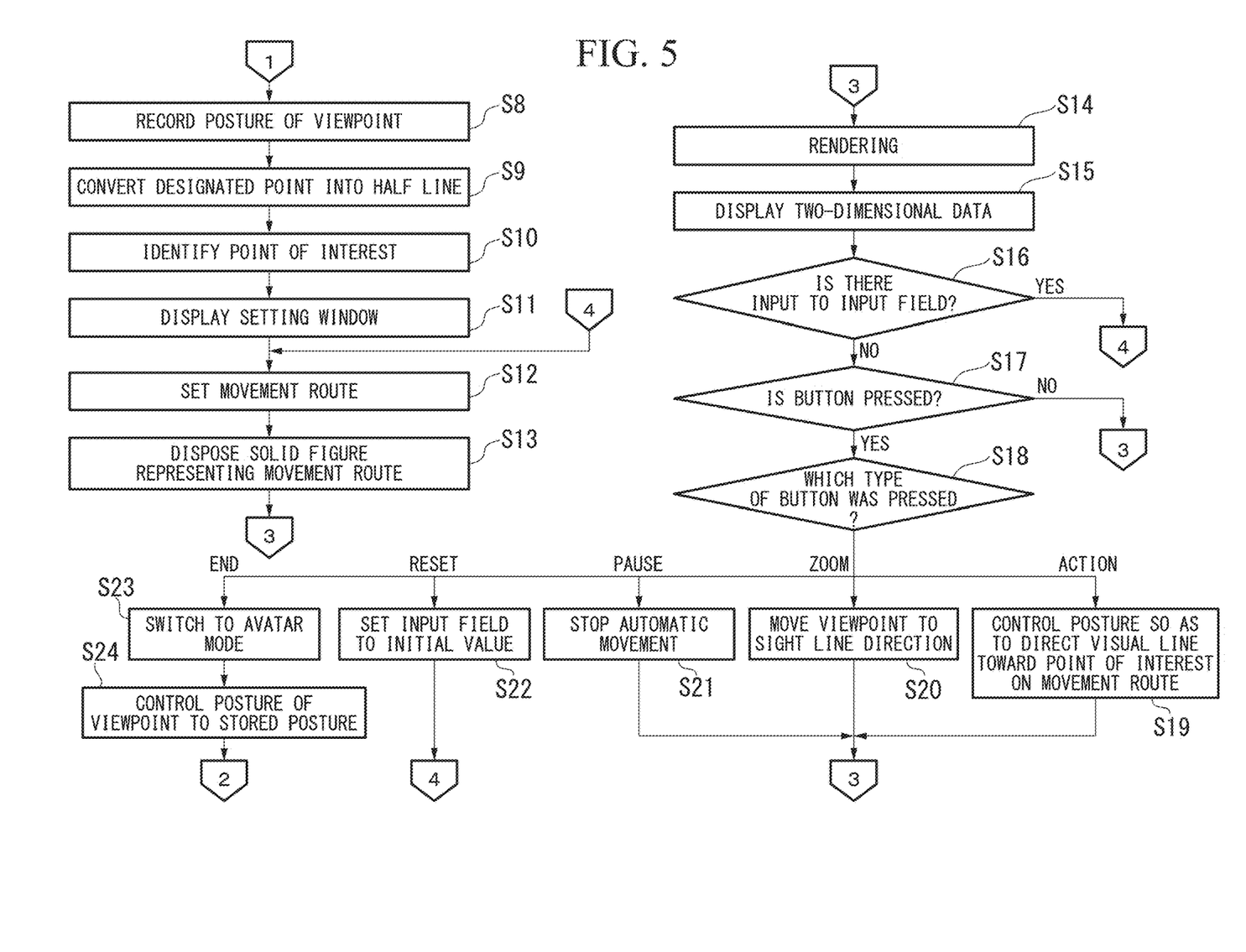
FIG. 5 is a flowchart which shows an operation of the three-dimensional data display device according to the first embodiment in a satellite mode.

FIG. 4 is a flowchart which shows an operation of the three-dimensional data display device according to the first embodiment in the avatar mode. FIG. 5 is a flowchart which shows an operation of the three-dimensional data display device according to the first embodiment in a satellite mode.

When the three-dimensional data display device 10 is started, the movement mode is set to the avatar mode. When the three-dimensional data display device 10 is started, the viewpoint takes a predetermined initial posture.

Figure 6:
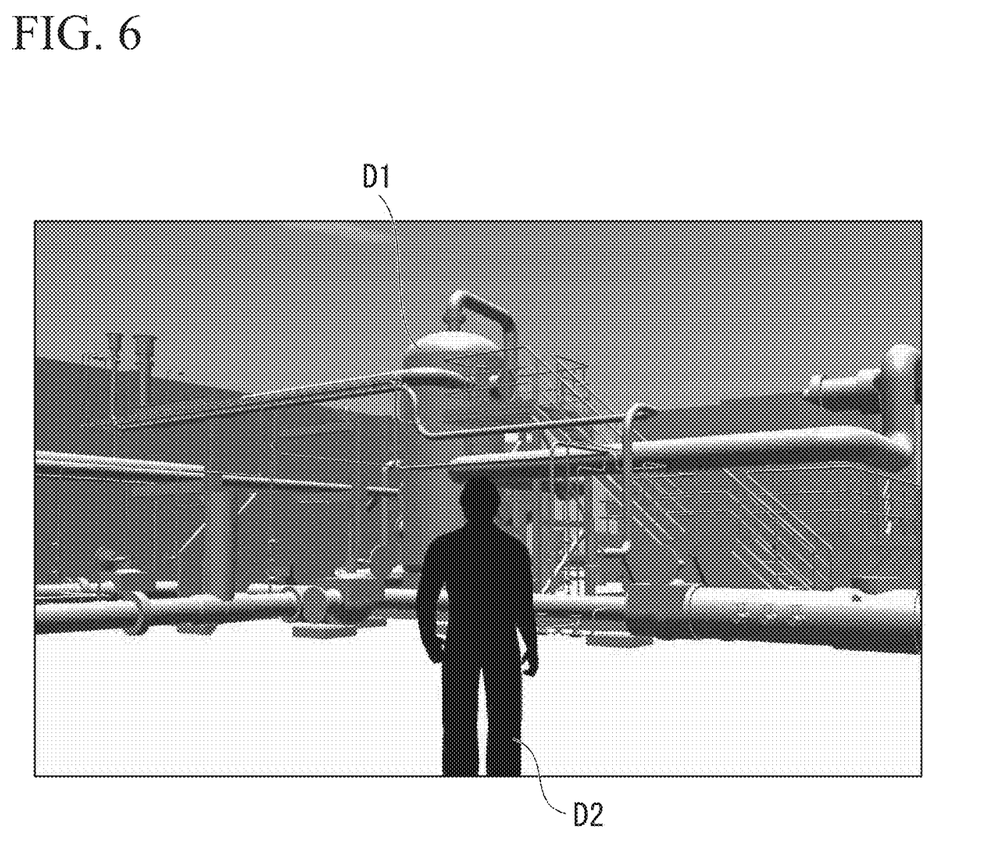
FIG. 6 is a diagram which shows a display example of three-dimensional data when a movement mode is the avatar mode.

If the three-dimensional data display device 10 is started, the viewpoint control unit 103 of the arithmetic operation device 15 disposes the avatar at a predetermined position ahead of the viewpoint in a sight line direction (step S1). The rendering unit 104 renders the three-dimensional data stored in the virtual space storage unit 101, and obtains two-dimensional data (step S2). The display control unit 105 causes the display device 11 to display the rendered two-dimensional data (step S3). FIG. 6 is a diagram which shows a display example of the three-dimensional data when a movement mode is the avatar mode. The display device 11 displays the two-dimensional data showing a facility D1 and an avatar D2 represented by the three-dimensional data as shown in FIG. 6.

Next, the mode switching unit 102 determines whether there has been an input for switching to the satellite mode in which a point on the two-dimensional data displayed on the display device 11 is designated by an operation of the mouse 12 (step S4). For example, the mode switching unit 102 may determine that there has been an input for switching to the satellite mode in which a point on the two-dimensional data is designated when the mouse 12 is right clicked on the two-dimensional data displayed on the display device 11, and an item indicating switching to the satellite mode is selected among a menu displayed by the right clicking.

When there is no input for switching to the satellite mode (NO in step S4), the viewpoint operation unit 106 receives an operation input of a viewpoint through the joy pad 14 (step S5). The viewpoint control unit 103 moves the avatar disposed in the virtual space in accordance with an operation input received by the viewpoint operation unit 106 (step S6). At this time, the viewpoint control unit 103 controls the posture of a viewpoint to follow the avatar (step S7). Specifically, the viewpoint control unit 103 controls the posture of a viewpoint such that the sight line direction of a viewpoint coincides with the sight line direction of the avatar and the position of a viewpoint is positioned at a predetermined position behind the sight line direction of the avatar. Then, the three-dimensional data display device 10 returns to the processing in step S2, and performs rendering of the three-dimensional data.

When there is an input for switching to the satellite mode in step S4 (YES in step S4), the viewpoint recording unit 107 records the posture of a current viewpoint in the viewpoint storage unit 108 (step S8). Next, the identification unit 109 converts a point on the two-dimensional data designated in step S4 into a half line on the virtual space (step S9). Specifically, the identification unit 109 calculates the half line extending in a direction shifted from the sight line direction of a viewpoint by an angle according to coordinates of a designated point with the position of the viewpoint as an origin. Next, the identification unit 109 identifies a point on a surface of the three-dimensional data which intersects the converted half line and is closest to the viewpoint as a point of interest (step S10).

Next, the route setting unit 110 causes the display device 11 to display the setting window W shown in FIG. 3 by superimposing it on the two-dimensional data generated by the rendering unit 104 (step S11). An initial value is set in the input field W1 provided in the setting window W. The route setting unit 110 sets a movement route of a viewpoint on the basis of the point of interest identified by the identification unit 109 and the value set in the input field W1 (step S12). Specifically, the route setting unit 110 sets the movement route according to the following procedure. First, the route setting unit 110 determines an extending direction of a rotation axis on the basis of an Angle X value and an Angle Z value set in the input field W1. The route setting unit 110 sets a straight line extending in the determined direction and passing through the set point of interest as a rotation axis. The route setting unit 110 determines a point on the set rotation axis which is away from the point of interest by a Height value set in the input field W1 as a center point of the movement route. The route setting unit 110 sets a circle on a plane orthogonal to the rotation axis having the determined center point as an origin and a radius of a Radius value set in the input field W1 as the movement route. Next, the rendering unit 104 disposes a solid figure representing a movement route (for example, a polygon circumscribing the movement route) and the three-dimensional data stored in the virtual space storage unit 101 in the virtual space (step S13). That is, the solid figure has a shape different from the movement route. If the shape of the solid figure is the same circle as the movement route, it is difficult for a user to visually recognize whether the solid figure is rotating when the movement route is rotated in a circumferential direction by changing the Angle X value or the Angle Z value. On the other hand, it is possible for a user to visually recognize whether the solid figure rotates even when the movement route is rotated in the circumferential direction with the shape of the solid figure polygonal.

Figure 7:
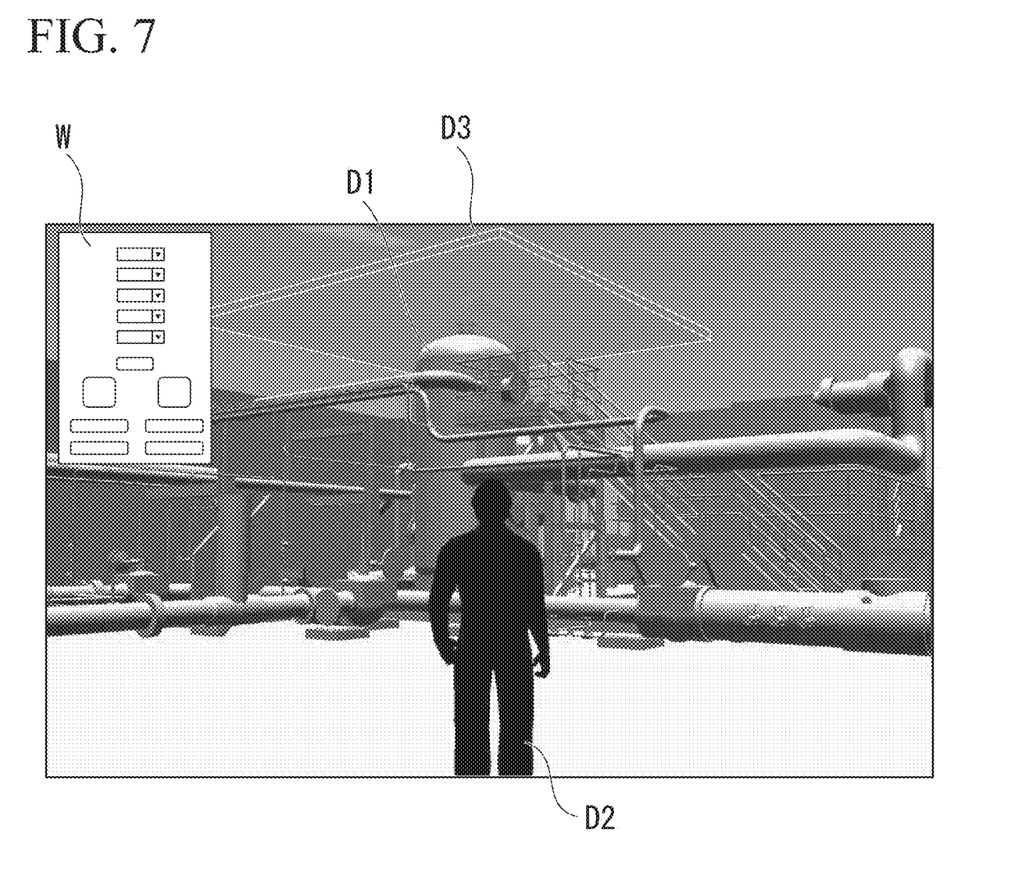
FIG. 7 is a diagram which shows a display example of three-dimensional data at the time of setting a movement route.

Next, the rendering unit 104 performs rendering of the three-dimensional data stored in the virtual space storage unit 101 and obtains two-dimensional data (step S14). The display control unit 105 causes the display device 11 to display the rendered two-dimensional data (step S15). FIG. 7 is a diagram which shows a display example of the three-dimensional data at the time of setting a movement route. As shown in FIG. 7, the display device 11 displays the two-dimensional data showing the facility D1 represented by the three-dimensional data, a solid figure D3 indicating a movement route, and the avatar D2, and displays the setting window W by superimposing it on the two-dimensional data.

The route setting unit 110 determines whether there is an input to the input field W1 of the setting window W by operations of the mouse 12 and the keyboard 13 (step S16). The route setting unit 110 returns to the processing in step S12 and sets a movement route on the basis of an input value when it is determined that there is an input to the input field W1 (YES in step S16). On the other hand, when it is determined that there has not been an input to the input field W1 (No in step S16), the route setting unit 110 determines whether a button of the setting window W is pressed by an operation of the mouse 12 and the keyboard 13 (step S17). When the button is not pressed (NO in step S17), the three-dimensional data display device 10 returns to the processing in step S14, and performs rendering of the three-dimensional data.

On the other hand, when the button is pressed down (YES in step S17), the viewpoint control unit 103 identifies a type of the pressed button (step S18).

Figure 8:
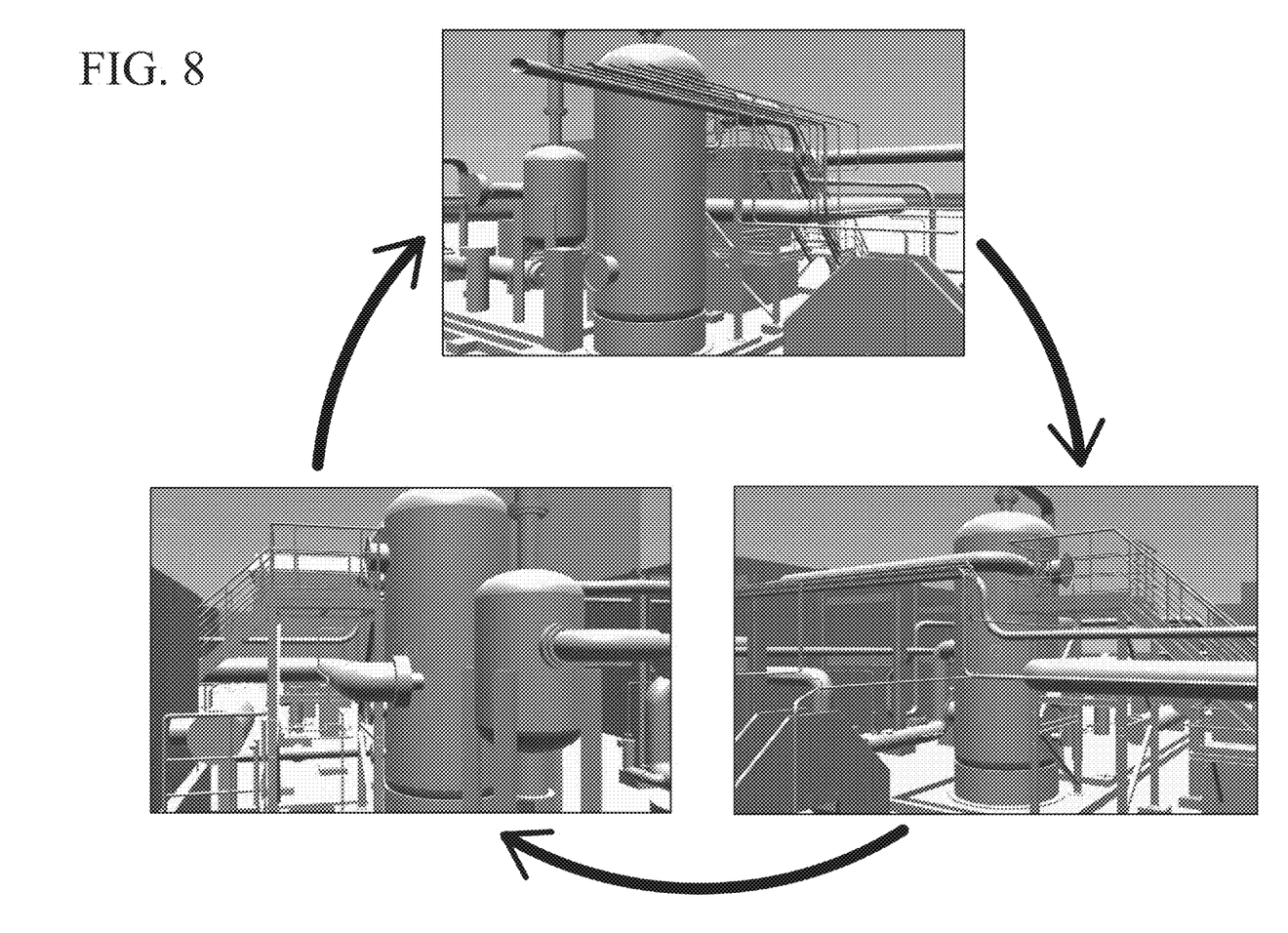
FIG. 8 is a diagram which shows a first display example of three-dimensional data when a movement mode is the satellite mode.

When the pressed button is the action button W3 (step S18: action), the viewpoint control unit 103 moves the viewpoint to a point on the movement route and controls the posture of the viewpoint such that the sight line direction directs toward the point of interest (step S19). Thereafter, the viewpoint control unit 103 automatically moves the viewpoint along the movement route with the sight line direction directed toward the point of interest. FIG. 8 is a diagram which shows a first display example of the three-dimensional data when a movement mode is the satellite mode. The display device 11 displays two-dimensional data showing a portion related to a point of interest among the three-dimensional data over time while changing a sight line direction as show in FIG. 8. As a result, the display device 11 can display an entire external appearance of a point of interest designated by a user.

Figure 9:
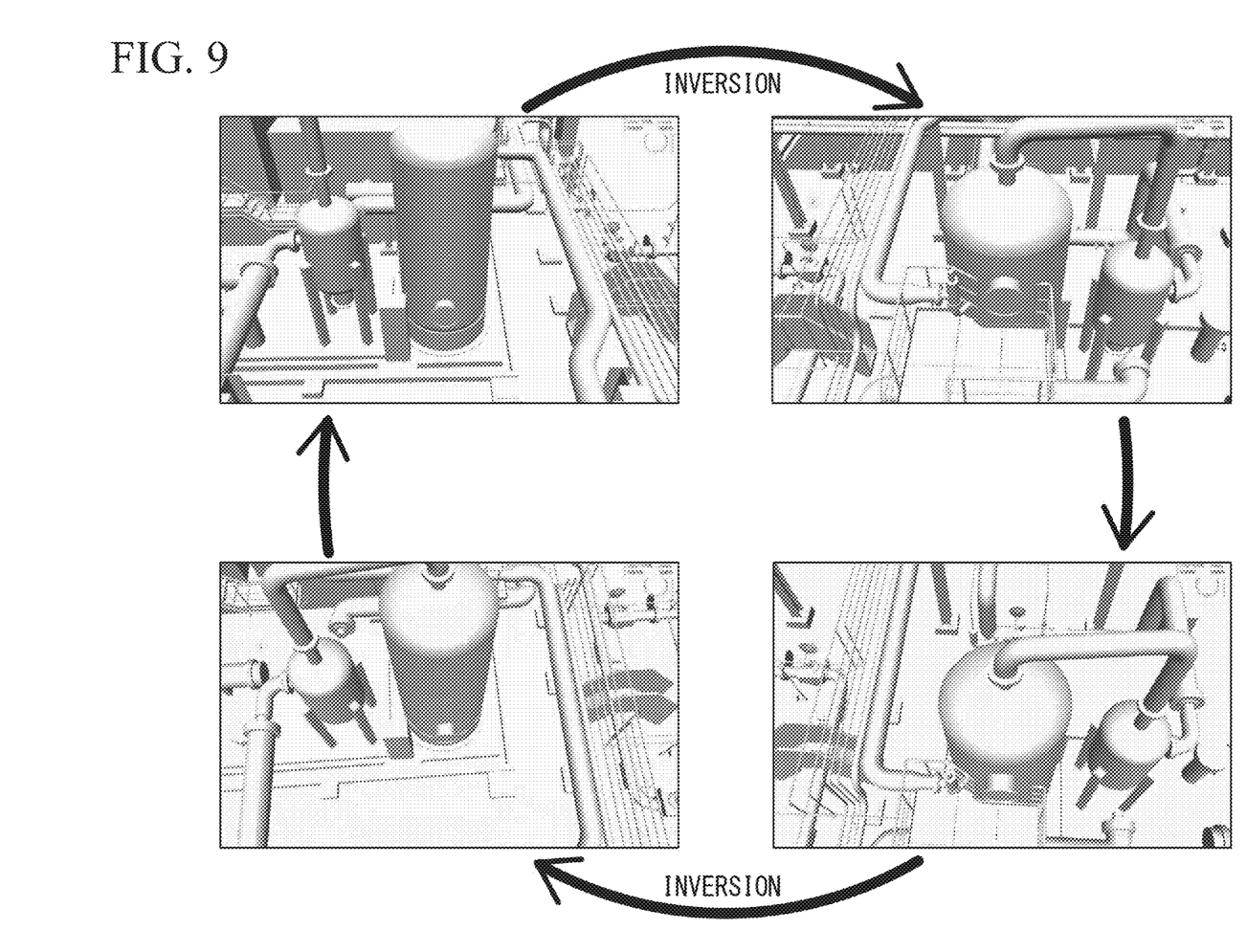
FIG. 9 is a diagram which shows a second display example of the three-dimensional data when a movement mode is the satellite mode.

At this time, the viewpoint control unit 103 moves the viewpoint such that a vertical direction of the viewpoint coincides with a vertical direction in the virtual space. FIG. 9 is a diagram which shows a second display example of the three-dimensional data when the movement mode is the satellite mode. The second display example is a display example of the three-dimensional data when the movement route of the viewpoint is set to be orthogonal to a horizontal plane. Since the viewpoint control unit 103 moves the viewpoint such that the vertical direction of the viewpoint coincides with the vertical direction in the virtual space, the vertical direction of the viewpoint is inverted when the sight line direction coincides with the vertical direction, as shown in FIG. 9. As a result, the display device 11 can display the entire external appearance of the point of interest while a vertical direction of the facility is maintained.

When the pressed button is the zoom button W4 (zoom in step S18), the viewpoint control unit 103 moves the viewpoint in the sight line direction (step S20). Specifically, when a zoom-in button of the zoom buttons W4 is pressed, the viewpoint control unit 103 moves the viewpoint ahead in the sight line direction. When a zoom-out button of the zoom buttons W4 is pressed, the viewpoint control unit 103 moves the viewpoint behind in the sight line direction.

When the pressed button is the pause button W5 (pause in step S18), the viewpoint control unit 103 stops an automatic movement of the viewpoint along the movement route (step S21).

If the viewpoint control unit 103 controls the posture of the viewpoint in step S19, step S20, or step S21, the three-dimensional data display device 10 returns to the processing in step S14, and performs rendering of the three-dimensional data. At this time, the rendering unit 104 renders a plane orthogonal to the sight line direction and away from the viewpoint by a distance indicated by a Clipping value input to the input field W1 of the setting window W as a plane close to a clipping plane. Specifically, the rendering unit 104 draws an object present further on a depth side (ahead in the sight line direction) than the plane close to a set clipping plane among the three-dimensional data.

When the pressed button is the reset button W2 in step S18 (reset in step S18), the route setting unit 110 sets a value of the input field W1 as an initial value (step S22). Then, the three-dimensional data display device 10 returns to the processing in step S12, and sets a movement route again.

When the pressed button is the end button W6 in step S18 (end in step S18), the mode switching unit 102 switches a movement mode from the satellite mode to the avatar mode (step S23). Next, the viewpoint control unit 103 controls the posture of the viewpoint so as to be the posture stored in the viewpoint storage unit 108 (step S24). Then, the three-dimensional data display device 10 returns to the processing in step S2 and performs rendering of the three-dimensional data.

In this manner, according to the first embodiment, the three-dimensional data display device 10 moves a viewpoint along a circular movement route surrounding a point of interest with a sight line directed toward the point of interest, and renders the three-dimensional data on the basis of the viewpoint. As a result, the three-dimensional data display device 10 can help a user to easily recognize the spatial positions of parts constituting the facility.

A shape of the movement route of a sight line according to another embodiment may not be circular. For example, the movement route according to another embodiment may be another annular route surrounding a point of interest, such as an elliptical shape, an arc shape, a polygonal shape, or the like. On the other hand, when the movement route is circular, a user can observe a point of interest at the same distance from all the surroundings.

In addition, according to the first embodiment, the three-dimensional data display device 10 allows to receive an input of the geometric parameter settings of a movement route. As a result, a user can recognize the spatial positions of the parts constituting the facility from a desired angle.

The three-dimensional data display device 10 according to another embodiment may not receive an input of the geometric parameter settings of a movement route. For example, the three-dimensional data display device 10 according to another embodiment may move a viewpoint along a predetermined movement route.

In addition, according to the first embodiment, the three-dimensional data display device 10 stores the posture of a viewpoint at the time at which a point of interest is identified, ends the movement of a viewpoint along a movement route, and then changes the posture of a viewpoint to the stored posture. As a result, it is possible to prevent a user from being unable to ascertain the position of the avatar in a virtual space when the user operates the avatar with the joy pad 14.

Moreover, according to the first embodiment, the three-dimensional data display device 10 receives a selection of a point on two-dimensional data obtained by rendering using the mouse 12, and identifies a point on the half line, which corresponds to the selected point in the three-dimensional data and is a point the closest to a viewpoint, as a point of interest. As a result, a user can easily identify the point of interest.

The three-dimensional data display device 10 according to another embodiment may identify a point of interest regardless of the selection of a point on the two-dimensional data. For example, the three-dimensional data display device 10 according to another embodiment may also identify a point of interest by receiving an input of coordinates on the virtual space by the keyboard 13. In addition, in the three-dimensional data display device 10 according to another embodiment, when names of the parts of the facility are correlated with coordinates of the parts on three-dimensional data, the three-dimensional data display device 10 may also receive an input of the name of a part and identify coordinates correlated with the input name as coordinates of a point of interest.

In addition, the three-dimensional data display device 10 according to another embodiment may not identify a point on a half line, which corresponds to the selected point in the three-dimensional data and is a point the closest to a viewpoint, as a point of interest. For example, the three-dimensional data display device 10 according to another embodiment may correlate respective objects constituting three-dimensional data with the coordinates of a point of interest, and identify coordinates correlated with an object on a half line, which corresponds to the selected point in three-dimensional data and is the closest to a viewpoint, as the coordinates of a point of interest.

In addition, according to the first embodiment, the three-dimensional data display device 10 performs rendering such that the vertical direction of the two-dimensional data coincides with the vertical direction of the three-dimensional data. As a result, the three-dimensional data display device 10 can display the entire external appearance of the point of interest while maintaining the vertical direction of the facility.

The three-dimensional data display device 10 according to another embodiment may not cause the vertical direction of the two-dimensional data and the vertical direction of the three-dimensional data to coincide with each other in rendering. For example, the three-dimensional data display device 10 according to another embodiment may also change the vertical direction of the two-dimensional data according to the operation of a user.

In addition, according to the first embodiment, when the three-dimensional data display device 10 receives pressing of the zoom button W4 during the movement of a viewpoint along a movement route, the viewpoint is moved according to the pressing. As a result, the three-dimensional data display device 10 can render a part that a user wants to view even during an automatic movement of the viewpoint. An operation input of the viewpoint is not limited to the pressing of the zoom button W4. For example, the three-dimensional data display device 10 according to another embodiment may also receive the operation of the joy pad 14 during the movement of the viewpoint along a movement route.

The three-dimensional data display device 10 according to another embodiment may not receive the operation input of the viewpoint during the movement of the viewpoint along a movement route.

Although the embodiments have been described in detail with reference to the drawings, a specific configuration is not limited to that described above, and various design changes and the like can be made.

Figure 10:
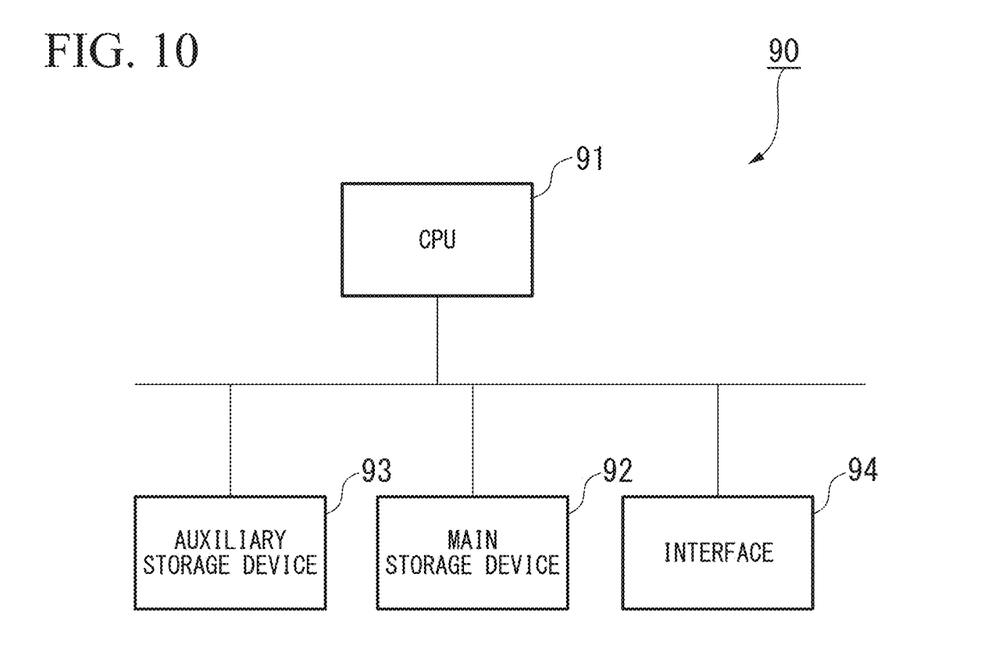
FIG. 10 is a schematic block diagram which shows a configuration of a computer according to at least one embodiment.

FIG. 10 is a schematic block diagram which shows a configuration of a computer according to at least one embodiment.

A computer 90 includes a CPU 91, a main storage device 92, an auxiliary storage device 93, and an interface 94.

The three-dimensional data display device 10 described above includes the computer 90. Further, an operation of each processing unit described above is stored in the auxiliary storage device 93 in a form of a program. The CPU 91 reads a program from the auxiliary storage device 93, expands the program to the main storage device 92, and executes the processing described above according to the program. In addition, the CPU 91 ensures a storage region corresponding to each storage unit described above in the main storage device 92 according to a program.

In at least one embodiment, the auxiliary storage device 93 is an example of a non-transitory tangible medium. Other examples of a non-transitory tangible medium include a magnetic disk, a magneto-optical disc, a compact disc read only memory (CD-ROM), a digital versatile disc read only memory (DVD-ROM), a semiconductor memory, and the like, which are connected through the interface 94. In addition, when this program is delivered to the computer 90 by a communication line, the computer 90 which receives the delivery may also expand the program to the main storage device 92 and execute the processing described above.

In addition, the program may be a program which realizes some of the functions described above. Furthermore, the program may be a program which realizes the functions described above by being combined with other programs already stored in the auxiliary storage device 93, which is a so-called difference file (a difference program).

INDUSTRIAL APPLICABILITY

The three-dimensional data display device can help an operator to easily recognize spatial positions of parts constituting a plant.

REFERENCE SIGNS LIST

10 Three-dimensional data display device
101 Virtual space storage unit
102 Mode switching unit
103 Viewpoint control unit
104 Rendering unit
105 Display control unit
106 Viewpoint operation unit
107 Viewpoint recording unit
108 Viewpoint storage unit
109 Identification unit
110 Route setting unit

What is claimed is:

1. A three-dimensional data display device comprising:
    a rendering unit which is configured to obtain two-dimensional data by rendering three-dimensional data on the basis of a viewpoint;
    an identification unit which is configured to identify a point of interest which is a point designated by a user of points in the three-dimensional data;
    a viewpoint control unit which is configured to move the viewpoint along an annular movement route surrounding the point of interest with a sight line directed toward the point of interest; and
    a route setting unit which is configured to receive an input of the geometric parameter settings of the movement route,
    wherein the route setting unit determines an extending direction of a rotation axis of the movement route, and sets a straight line extending in the determined direction passing through the point of interest, as the rotation axis, and
    wherein the rendering unit is configured to render a solid figure which represents the movement route and the three-dimensional data when the route setting unit is configured to receive the input of the geometric parameter settings.

2. The three-dimensional data display device according to claim 1,
    wherein the solid figure has a shape different from the movement route.

3. The three-dimensional data display device according to claim 1, further comprising:
    a viewpoint recording unit which is configured to record a position of the viewpoint and a sight line direction at the time at which the point of interest is identified by the identification unit in a viewpoint storage unit;
    wherein the viewpoint control unit is configured to change a position of the viewpoint and a sight line direction to the position and the sight line direction stored by the viewpoint storage unit after a movement of the viewpoint along the movement route ends.

4. The three-dimensional data display device according to claim 1, further comprising:
    a point of interest input unit which is configured to receive a selection of a point in the three-dimensional data obtained by the rendering unit,
    wherein the identification unit is configured to identify a point on a half line which corresponds to the selected point in the three-dimensional data and is closest to the viewpoint as the point of interest.

5. The three-dimensional data display device according to claim 1,
    wherein the rendering unit is configured to render a vertical direction of the two-dimensional data to coincide with a vertical direction of the three-dimensional data.

6. The three-dimensional data display device according to claim 1,
    wherein the movement route is in an annular shape centered on the point of interest.

7. The three-dimensional data display device according to claim 1, further comprising:
    a viewpoint operation unit which is configured to receive an operation input of the viewpoint,
    wherein the viewpoint control unit moves the viewpoint according to the input when the viewpoint operation unit is configured to receive the input during a movement of the viewpoint along the movement route.

8. A method of displaying three-dimensional data comprising:
    obtaining two-dimensional data by rendering three-dimensional data on the basis of a viewpoint;
    identifying a point of interest which is a point designated by a user of points in the three-dimensional data;
    moving the viewpoint along an annular movement route surrounding the point of interest with a sight line directed toward the point of interest;
    receiving an input of the geometric parameter settings of the movement route;
    determining an extending direction of a rotation axis of the movement route;
    setting a straight line extending in the determined direction passing through the point of interest, as the rotation axis; and
    rendering a solid figure which represents the movement route and the three-dimensional data when receiving the input of the geometric parameter settings.

9. A non-transitory computer-readable computer medium storing a program which causes a computer to execute functions, the functions comprising:
    obtaining two-dimensional data by rendering three-dimensional data on the basis of a viewpoint;
    identifying a point of interest which is a point designated by a user of points in the three-dimensional data;
    moving the viewpoint along an annular movement route surrounding the point of interest with a sight line directed toward the point of interest;
    receiving an input of the geometric parameter settings of the movement route;
    determining an extending direction of a rotation axis of the movement route; and
    setting a straight line extending in the determined direction passing through the point of interest, as the rotation axis; and
    rendering a solid figure which represents the movement route and the three-dimensional data when receiving the input of the geometric parameter settings.

* * * * *